UNITED STATES PATENT OFFICE.

FABRICIUS COBELLIS, OF PHILADELPHIA, PENNSYLVANIA.

MANUFACTURE OF PEROXID OF HYDROGEN AND BARIUM NITRATE.

1,273,824.  Specification of Letters Patent.  Patented July 30, 1918.

No Drawing.  Application filed January 18, 1917. Serial No. 143,016.

*To all whom it may concern:*

Be it known that I, FABRICIUS COBELLIS, a subject of the King of Italy, residing at Philadelphia, in the county of Philadelphia and State of Pennsylvania, have invented certain new and useful Improvements in the Manufacture of Peroxid of Hydrogen and Barium Nitrate, of which the following is a specification.

My invention relates to a process for the manufacture of hydrogen peroxid, in conjunction with the production of barium nitrate. The method is subject to variation according to whether chemically pure hydrogen peroxid is required or whether the ordinary commercial product is desired.

A well known method of producing hydrogen peroxid consists in acting upon barium dioxid with certain mineral acids, as muriatic, phosphoric, sulfuric, hydrofluoric or hydrofluo-silicic acid. A disadvantage of this method is that it produces a nearly valueless by-product.

According to my invention I employ at the proper stage of the operation, nitric acid (or a nitrate), in place of the mineral acids heretofore employed, with production as a by-product of barium nitrate which is valuable because from it may be secured barium dioxid and nitric acid, according to a well known process. These two products may both be used again in the manufacture of hydrogen peroxid, so that my process thereby becomes a continuous or repeating process.

I will first describe my process as applied to the manufacture of C. P. hydrogen peroxid.

I first act upon barium dioxid with say phosphoric acid, or with barium acid phosphate, or primary calcium phosphate, or primary magnesium phosphate, according to one of the following reactions:

1. $BaO_2 + H_3PO_4 = H_2O_2 + (BaHPO_4)$
2. $BaO_2 + Ba(H_2PO_4)_2 = H_2O_2 + 2BaHPO_4$
3. $BaO_2 + Ca(H_2PO_4)_2 =$
   $H_2O_2 + BaHPO_4 + CaHPO_4$

Taking now for example the first of these reactions it will be noted that it produces hydrogen peroxid and secondary barium phosphate. According to my invention, I act upon this barium phosphate with a solution of nitric acid thereby securing barium nitrate and primary barium phosphate according to the following equation:

$2BaHPO_4 + 2HNO_3 =$
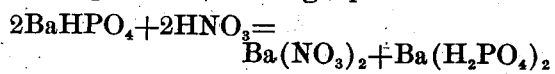
$\qquad Ba(NO_3)_2 + Ba(H_2PO_4)_2$

I separate the barium nitrate from this solution by adding an excess of nitric acid (barium nitrate is sparingly soluble in an acid solution and particularly in nitric acid solution), and by filtering the precipitate which consists mainly of barium nitrate, and then washing it with more nitric acid solution, which washing solution may be kept for the next operation. In this way I obtain the barium nitrate as a valuable by-product which I use for the manufacture of barium dioxid and nitric acid according to the well known process, decomposing the barium nitrate by heat with production of barium oxid and nitrous acid, of which the former is oxidized to produce barium dioxid, and the latter used for production of nitric acid.

The filtrate is evaporated down in order to concentrate and to crystallize out the primary barium phosphate present; or better it is evaporated to dryness in order to distil off the excess of nitric acid present. The residue, consisting of primary barium phosphate, is used again for the production of hydrogen peroxid according to equation No. 2, above given.

Instead of using primary barium phosphate according to equation No. 2, I may use primary calcium phosphate, according to equation No. 3. In this case I act upon the mother liquor containing the primary barium phosphate with the calculated quantity of calcium nitrate in order to produce a further quantity of barium nitrate, thus:

$Ba(H_2PO_4)_2 + Ca(NO_3)_2 =$
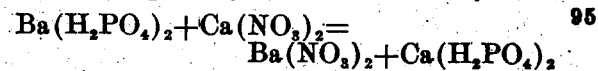
$\qquad Ba(NO_3)_2 + Ca(H_2PO_4)_2$

I usually add in this reaction some nitric acid in order to keep in solution the primary calcium phosphate and to precipitate the barium nitrate which, as I stated above, is sparingly soluble in acid solution. Here as above the excess of nitric acid is distilled off and the residue after a further crystallization used again, in the same way as explained for the primary barium phosphate, but in this case I find it more convenient to treat the mother liquor containing the primary calcium phosphate (and some other salts as an impurity), with sulfuric acid in order to produce free phosphoric acid, which can be easily separated from the insoluble calcium sulfate. I then distil off the eventual nitric acid present, and use the remaining phosphoric acid for producing peroxid of hydrogen and secondary barium phosphate as explained in equation No. 1. The reaction is carried on according to the following equation:

$$Ca(H_2PO_4)_2 + H_2SO_4 = CaSO_4 + 2H_3PO_4$$

Another convenient way of producing the barium nitrate required is to act upon secondary barium phosphate with calcium nitrate, using equal molecular proportions, by boiling (with or without pressure) in aqueous solution with a very small quantity of nitric acid. This produces barium nitrate and secondary calcium phosphate. The barium nitrate is soluble in boiling water and by filtration is separated from the insoluble secondary calcium phosphate. The latter boiled with a solution of sulfuric acid produces phosphoric acid, which after separation from the insoluble calcium sulfate may be used again in making hydrogen peroxid.

I will now describe the variation in my process which I employ when producing commercial hydrogen peroxid from which the chemically pure material may be secured by extraction by well known methods, as for example distillation *in vacuo*, or extraction with ether; or it may be used for the manufacture of perborate.

For this purpose I act upon barium dioxid initially with a small quantity of an acid which produces soluble salts with barium dioxid as for example, acetic acid or phosphoric acid, or other suitable acid, or their salts. I use for example, to every one hundred pounds of barium dioxid from five to ten pounds of said acid or salts. I then add nitric acid which produces barium nitrate, a salt sparingly soluble in said solution, setting free more acetic or phosphoric acid, capable of reaction again with barium dioxid. I then add enough barium dioxid to neutralize such acid, and then nitric acid again, and so on until the required strength of hydrogen peroxid is reached. This operation is carried on according to the following equation:

$$10BaO_2 + H_3PO_4 + 18HNO_3 = 10H_2O_2 + BaHPO_4 + 9Ba(NO_3)_2$$

At this point I acidify the solution and then filter out the barium nitrate which is sparingly soluble in acid. I evaporate the filtrate in order to concentrate the hydrogen peroxid solution and recover more barium nitrate. Then I precipitate all the barium salts present and neutralize, obtaining what I call commercial hydrogen peroxid. From this sodium perborate may be produced, or chemically pure hydrogen peroxid by distillation *in vacuo* or by extraction with ether.

According to another variation of my process I obtain the commercial hydrogen peroxid by acting upon barium dioxid with muriatic acid in the presence of a small amount of phosphate or phosphoric acid, thus, producing hydrogen peroxid and barium chlorid. I then add to such solution a nitrate such as sodium or ammonium or calcium nitrate and acidify the mixture with a suitable acid, say nitric acid, thus producing barium nitrate, which is crystallized out and commercial hydrogen peroxid, which, after the proper neutralization and precipitation of the barium salts is ready for use or may be used in the preparation of perborate or chemically pure hydrogen peroxid as above.

The many possible variations of my process will be evident to the chemist from the examples which I have given. All are characterized by the employment of nitric acid (or a nitrate), to convert what is otherwise a nearly valueless by-product of the hydrogen peroxid process into a product valuable in itself but especially valuable for continuing the production of peroxid of hydrogen.

Having thus described my invention, I claim:

1. The process of obtaining barium nitrate in conjunction with the manufacture of hydrogen peroxid, which consists in treating barium dioxid with phosphoric acid, with production of hydrogen peroxid and a barium phosphate, and then converting the barium phosphate into a nitrate.

2. The process of obtaining barium nitrate in conjuction with the manufacture of hydrogen peroxid which consists in treating barium dioxid with primary barium phosphate, with production of hydrogen peroxid and a secondary barium phosphate, and then converting the latter into nitrate by the addition of an acidified nitrate.

3. The process of obtaining barium nitrate in conjunction with the manufacture of hydrogen peroxid, which consists in treating barium dioxid with primary barium phosphate, with production of hydrogen peroxid and a secondary barium phosphate; converting the latter into nitrate by the addition of nitric acid and calcium nitrate, the $HNO_3$ being in excess of two molecules to one of $Ca(NO_3)_2$; and treating the remaining calcium acid phosphate with sulfuric acid to produce calcium sulfate and phosphoric acid.

4. The process of obtaining barium nitrate in conjunction with the manufacture of hydrogen peroxid, which consists in treating barium dioxid with phosphoric acid, with production of hydrogen peroxid, and secondary barium phosphate, and acting upon the latter with acidified calcium nitrate in aqueous solution, with production of barium nitrate, and secondary calcium phosphate.

5. The method of producing hydrogen peroxid which consists in acting upon barium dioxid by an acid, with formation of hydrogen peroxid, and a barium salt; subjecting the barium salt to the action of nitrate, with formation of barium nitrate; converting into barium dioxid and nitric acid the barium nitrate, and utilizing the barium dioxid and nitric acid thus obtained for the further repetition of the process.

6. The method of re-utilizing barium salts, resulting as a by-product from the manufacture of hydrogen peroxid, which consists in treating the same with a nitrate, with production of barium nitrate; using said barium nitrate for the production of barium dioxid and nitric acid, and then using said barium dioxid for the production of hydrogen peroxid.

In testimony whereof, I have hereunto signed my name at Philadelphia, Pennsylvania, this thirteenth day of January, 1917.

FABRICIUS COBELLIS.

Witnesses:
JAMES H. BELL,
E. L. FULLERTON.